3,104,971
COPPER RECOVERY PROCESS
George G. Olson, John T. Long, Jr., and Cornelis J. Heinink, Phoenix, Ariz., assignors to Chemetals Corporation, New York, N.Y., a corporation of Delaware
No Drawing. Filed Feb. 7, 1961, Ser. No. 87,546
8 Claims. (Cl. 75—117)

This invention relates to a process of recovering copper values from copper bearing aqueous solutions and more particularly to a liquid-liquid extraction process in which an aqueous copper bearing solution is contacted with a substantially water-immiscible organic mixture of an ammonium salt of an organophosphoric acid dissolved in an organic diluent, whereby the copper values are extracted from the aqueous phase to the organic phase, and separating the resultant copper loaded organic phase from the remaining aqueous phase.

The recovery of copper from solutions of its salts has been practiced by the metallurgical industry for many years. It is common practice in the art to remove the copper from such solutions by causing the dissolved copper to precipitate as a solid material which may be either metallic copper or an insoluble salt. Metallic copper may be precipitated from solution by contacting the solution with a metal such as iron or aluminum which is above copper in the electrochemical series. The iron or aluminum goes into solution replacing the copper and metallic copper is precipitated. This process is commonly referred to as cementation and the finely divided copper precipitate as copper cement. Metallic copper may also be recovered from solution by electrodeposition which occurs when an electric current is passed through a solution of copper salts. Copper may also be removed from solution as an insoluble compound such as copper sulfide, copper oxide, or the basic copper carbonate. In each of these methods the copper must be further refined either by redissolving and purification of the solution or by classical smelting and pyrometallurgical refining. In some cases copper recovered by electrodeposition is not subject to a further refining. Solutions where these methods of recovery are in common practice include mine waters, leach liquors from oxide ore dumps, spent electrolyte from electrolytic plating, and the like.

It has now been found that copper values may be conveniently recovered from aqueous copper bearing solutions by liquid-liquid solvent extraction techniques by contacting the copper bearing solutions, generally from mine waters, leaching circuits on oxide ores, etc., with a substantially water-immiscible solvent extraction reagent comprising an ammonium salt of an organophosphoric acid dissolved in an inert organic diluent. The copper ions react with the extraction reagent at the interface between the water-immiscible organic phase and aqueous phase, and the copper values are thereby transferred to the organic phase. The reaction is very rapid and the organic phase is loaded with copper values with a minimum of agitation. The two phases are then separated. The remaining aqueous phase is returned to a leaching circuit and the organic phase containing the copper values is sent to a stripping circuit where the copper is stripped from the organic phase. Advantageously the stripping may be accomplished with either a mineral acid solution or a solution of ammonia and an alkaline reagent.

The process used according to the present invention provides an economical process whereby copper values are recovered from copper bearing solutions in a highly pure slate and in high yield.

The solvent extraction reagent which can be used according to this invention is advantageously an ammonium salt of an organophosphoric acid compound and this salt can be represented by the following formula:

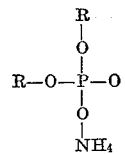

where R is selected from the group consisting of alkyl, aryl, and aralkyl radicals. Since the compound must be substantially water-immiscible, the total number of carbon atoms in the molecule should be sufficient to render the compound substantially insoluble. Generally at least 8 carbon atoms should be present. R of course can be substituted with a variety of groups such as alkoxy, halogens, etc., and R can be saturated or unsaturated or interrupted by hetero atoms so long as there is no interference in the performance of the organic phosphate compound in extracting copper ions from the aqueous phase to the organic phase. It is only necessary that the organic phosphate, in addition to its extracting function, be soluble in organic diluents and have sufficient carbon atoms to render the compound insoluble in water.

The ammonium salts referred to above are readily prepared in addition to any of the other well-known methods, by reacting an alkanol or a phenol or mixtures thereof with an acid halide of phosphorous, hydrolyzing the resulting organophosphoryl halide and neutralizing the organophosphoric acid with ammonium hydroxide. Various organophosphoric acid compounds can be advantageously reacted with ammonium hydroxide and used according to this invention and these compounds include di (2-ethylhexyl) phosphoric acid, heptadecylphosphoric acid, dodecylphosphoric acid, di (1-methylheptyl) phosphoric acid, diisooctylphosphoric acid, di (2-ethyl-4-methylpentyl) phosphoric acid, di (2-propyl-4-methylpentyl) phosphoric acid, octylphenyl phosphoric acid, the isooctyl or stearyl derivatives of alkyl acid phosphates, and the like.

Although the ammonium salts of these organophosphoric acid compounds have been disclosed as being particularly advantageous in extracting copper ions from an aqueous solution, other equivalent alkaline salts, i.e., sodium, potassium, and the like of dialkylphosphoric acid, dialkylphosphinic acid, monoalkylphosphoric acid, alkylphosphonic acid, alkyl pyrophosphoric acid and the aromatic acid phosphates can be used according to the teaching of this invention, and can readily be determined by routine experimentation by one skilled in the art. Generally these compounds again should contain at least 8 carbon atoms in order to render them substantially water-insoluble.

A wide variety of organic diluents, in which the extraction reagent is dissolved, can be employed according to this invention. The minimum requirements for the diluent, however, are that the diluent be substantially water-immiscible, that it will dissolve the extraction reagent, and that it will not interfere with the function of the reagent in extracting the copper values from aqueous copper bearing solutions. These diluents can be aliphatic or aromatic hydrocarbons, halogenated hydrocarbons, petroleum derivatives, ethers, etc. Examples of these various diluents include toluene, carbon tetra-chloride, benzene, chloroform, 2-ethyl-hexanol, and particularly kerosene.

Depending upon the particular extraction reagent and diluent employed, it may be advantageous to incorporate a long chain alcohol or other suitable material into the organic phase in order to prevent formation of a third phase between the organic and aqueous phases. For this purpose isodecanol has been found useful.

The copper bearing solutions from which the copper values are extracted, according to the teachings of this invention, generally are of a concentration of about one gram of copper per liter of solution. The concentration of the copper of course is not at all critical and can vary considerably and the copper content can be in the cuprous or cupric form. The copper is advantageously in an acidic solution.

Contacting the copper bearing aqueous solution with the solvent extraction reagent may be carried out by any of the well-known procedures employed in solvent-solvent extractions. Although continuous countercurrent methods are preferred, batch, continuous batch, and batch countercurrent methods are also useful. Any suitable liquid-liquid contacting means may be employed such as the mixer-settler device, a countercurrent rotating disc column, and the like. The temperature at which the mixing is carried out is not critical but advantageously the temperature is maintained at about 20° C. to 40° C.

The ratio of the volume of the organic phase to the aqueous phase can be varied considerably and the most efficient ratio in each case can be readily determined by one skilled in the art. The particular ratio selected for any given extraction may depend upon the extraction reagent, diluent, and type of copper bearing solution employed as well as their concentration and the method of mixing them, etc. Countercurrent methods are usually desirable when the ratio of the organic phase to the aqueous phase is relatively low. Preferably, the ratio of the organic phase to the aqueous phase is from about 1:1 to 1:8 but, as stated above, this range is not critical and can vary considerably.

The amount of diluent employed in relation to the extraction reagent will depend on the particular extraction technique employed as well as the particular reagents, diluents, etc. used. A mixture of about 10% by weight in kerosene of the ammonium salt of di (2-ethylhexyl) phosphoric acid has been advantageously employed.

After the copper values have been transferred to the organic phase and the aqueous and organic phases separated, the organic phase is transferred to a stripping circuit. The apparatus for this circuit can be identical to that used in the loading step, or any other suitable liquid-liquid contactor. In the stripping circuit the copper containing organic phase is advantageously contacted with a strong aqueous solution of ammonium hydroxide and an ammonium salt, preferably ammonium carbonate. In the reaction which then takes place the reverse exchange of copper occurs at the interface of the organic and aqueous phases. The copper enters the aqueous phase as the soluble tetrammine copper carbonate and the ammonium replaces the copper in the organic extraction reagent. The extraction reagent is thus regenerated and is ready to pick up additional copper from a fresh solution. The copper is now in solution as a soluble tetrammine-copper carbonate. By controlling the concentration of the organic extraction reagent in the organic phase and the concentration and volume of the aqueous stripping solution, the copper can be concentrated in the ammonia-ammonium carbonate solution to many times the concentrations in the original feed solution. From copper bearing aqueous solutions containing about 1 gram per liter of dissolved copper, such as often found in mine waters and leach liquors from oxide ore dumps, ammonia-ammonium carbonate solutions containing 96 grams per liter of copper can be produced.

The solution resulting from this recovery technique has removed copper from many of the impurities in the original solution and has concentrated it to the point where it may be charged direct to a variety of recovery processes where a pure form of copper may be recovered. As an example, the solution may be charged direct to an autoclave for precipitation of pure copper powder by hydrogen reduction. Such a copper powder is a saleable form of copper in the powder metallurgy industry.

Although the alkaline concentration of the stripping solution can vary widely, a solution containing about 5% free ammonium hydroxide and 25% ammonium carbonate has been advantageously employed. A concentrated ammonium hydroxide solution can also be used. The ratio of the volume of the organic phase to the aqueous stripping phase can also vary widely, particularly depending upon the concentration of copper desired in thet final aqueous solution. The preferred ratio of the volume of the organic phase to the aqueous stripping phase is 1:1 to 10:1.

The concentration of the final copper solution is dependent upon the concentration of the ammonium hydroxide and the ammonium salt in the stripping solution and on the amount of loading in the organic phase. If a heavily loaded extraction reagent in kerosene is treated with a small volume of a strong ammonium hydroxide ammonium salt solution, the resulting copper solution can easily be in the order of 50 grams or more of copper per liter of solution.

Depending on the end use of the purified and concentrated final copper solution, various other stripping solutions can be used. Ammonia-ammonium sulfate solutions or other suitable alkali solutions can be used as well as mineral acid solutions such as sulfuric, nitric, hydrochloric, phosphoric acids and the like. The copper-containing aqueous acid stripping solution may be used as an electrolyte to recover pure copper by electrolysis.

If acid stripping is used the copper reports to the aqueous phase as a simple copper salt solution depending on the acid used. If ammonium hydroxide and an ammonium salt solution is used for stripping, the copper reports to the aqueous phase as the tetraammino copper complex salt. When an ammonia-ammonium salt solution is used for stripping the extraction reagent is regenerated as the ammonium salt and is ready for immediate recycling to the loading circuit. When acid stripping is used, the extraction reagent formed in the organic phase must be treated with ammonia prior to its recycle to the loading circuit so that it is again in the form of its ammonium salt.

The invention is further illustrated by the following example, but it is understood that the invention is not limited thereto and that various modifications and equivalent materials can be used without departing from the basic teaching and spirit of the invention described herein.

*Example I*

An organic mixture containing an extraction reagent and a diluent was prepared in the following manner: A weight volume solution of 10% by weight of di (2-ethylhexyl) phosphoric acid, 3% by weight of isodecanol, and 87% by volume of kerosene was prepared. The isodecanol was added to prevent the formation of a third phase between the organic and aqueous phases. The organic mixture was then contacted with a 5% aqueous solution of sulfuric acid in a suitable mixing vessel. After contacting for several minutes, the phases were separated by allowing them to stand and settle. The organic layer was decanted and then contacted with successive portions of an aqueous solution containing 25% ammonium carbonate and 5% free ammonium hydroxide in a suitable mixing vessel until the reaction was complete. This was determined by measuring the pH before and after contacting the solutions. A constant pH indicated no further reaction was taking place.

The organic kerosene solution containing the ammonium salt of bis (2-ethyl hexyl) phosphoric acid was washed with water to remove any excess ammonium hydroxide that might be present.

A one gram/liter solution of copper sulfate was prepared by dissolving 3.9 grams of copper sulfate in a liter of water and adjusting the pH with sulfuric acid to 2. This solution is similar to copper bearing leach waters. The solution had a light blue color. The immiscible copper sulfate solution and kerosene solution were brought into contact with each other. This was accomplished in a counter-current rotating disc contactor column. It was observed that the blue color of the copper ions disappeared from the aqueous phase and a slight green color was observed in the organic phase. This indicated the transfer of the copper from the aqueous phase to the organic phase. The copper was removed from the copper salt of bis (2-ethylhexyl) phosphoric acid by treating the organic phase with a small volume of a concentrated solution of ammonium hydroxide and a soluble ammonium salt (5% free ammonium hydroxide and 25% ammonium carbonate). It was observed that after contacting the two phases as before, the organic layer had now lost its color and the aqueous phase indicated the very dark blue color of a strong solution of the tetra-ammonium copper complex ion.

The stripped kerosene solution once again contained the ammonium salt of bis (2-ethylhexyl) phosphoric acid and was ready for reuse in extracting copper values from fresh copper bearing solutions. The copper ammonia solution is adjusted to the proper ammonia to copper ratio and sent to a hydrogen reaction autoclave.

We claim:

1. A process for recovering copper values from a copper bearing aqueous solution which comprises contacting said solution with a substantially water-immiscible organic mixture of an ammonium salt of an organophosphoric acid having the formula

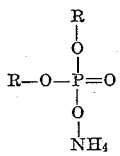

where R is selected from the group consisting of alkyl, aryl, and aralkyl radicals, dissolved in an organic diluent, whereby the copper values are extracted from the aqueous phase to the organic phase, and separating the resultant copper loaded organic phase from the remaining aqueous phase.

2. The process of claim 1 in which the water-immiscible mixture contains the ammonium salt of di(2-ethylhexyl) phosphoric acid.

3. The process of claim 1 in which the organic diluent is kerosene.

4. The process of claim 1 in which the water-immiscible mixture contains a long chain alcohol capable of preventing the formation of a third phase between the organic phase and the aqueous phase.

5. The process of claim 1 in which the water-immiscible organic mixture contains about 10% by weight of the ammonium salt of di(2-ethylhexyl) phosphoric acid and about 90% by weight of kerosene.

6. A process for recovering copper values from a copper bearing aqueous solution which comprises contacting said solution with a substantially water-immiscible organic mixture of an ammonium salt of an organophosphoric acid having the formula

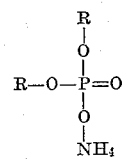

where R is selected from the group consisting of alkyl, aryl, and aralkyl radicals, dissolved in an organic diluent, whereby the copper values are extracted from the aqueous phase to the organic phase, separating the resultant copper loaded organic phase from the remaining aqueous phase, contacting said copper loaded organic phase with an aqueous alkaline solution, whereby the copper values are transferred to the aqueous alkaline solution, and separating the resultant copper loaded aqueous solution from the remaining organic phase.

7. The process of claim 6 in which the aqueous alkaline solution contains ammonium hydroxide and an ammonium salt.

8. The process for recovering copper values from a copper bearing aqueous solution which comprises contacting the copper bearing solution with a substantially water-immiscible organic mixture of an ammonium salt of an organo-phosphoric acid having the formula

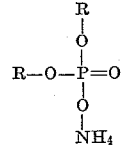

where R is selected from the group consisting of alkyl, aryl, and aralkyl radicals, dissolved in an organic diluent, whereby the copper values are extracted from the aqueous phase to the organic phase, separating the resultant copper loaded organic phase from the aqueous phase, stripping the organic phase by contacting the organic phase with an aqueous ammonium salt solution to form an aqueous ammonium salt solution containing the copper and recovering the copper from the aqueous solution by hydrogen reduction.

References Cited in the file of this patent

UNITED STATES PATENTS

| | | |
|---|---|---|
| 2,860,031 | Grinstead | Nov. 11, 1958 |
| 2,992,894 | Hazen et al. | July 18, 1961 |

FOREIGN PATENTS

| | | |
|---|---|---|
| 1,097,966 | Germany | Jan. 26, 1961 |